(12) United States Patent
Park et al.

(10) Patent No.: US 9,628,970 B2
(45) Date of Patent: Apr. 18, 2017

(54) METHOD AND DEVICE FOR CUSTOMIZING CONFIGURATION OF PRINTING APPLICATION

(71) Applicant: Samsung Electronics Co., Ltd., Suwon-si, Gyeonggi-do (KR)

(72) Inventors: Sang-hyun Park, Suwon-si (KR); Geun-chul Lee, Suwon-si (KR); Bong-gi Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/491,292

(22) Filed: Sep. 19, 2014

(65) Prior Publication Data
US 2015/0099502 A1    Apr. 9, 2015

(30) Foreign Application Priority Data

Oct. 7, 2013  (KR) .................. 10-2013-0119456

(51) Int. Cl.
| | |
|---|---|
| *H04W 4/16* | (2009.01) |
| *H04W 4/00* | (2009.01) |
| *G06F 3/12* | (2006.01) |
| *H04W 12/10* | (2009.01) |
| *H04M 1/725* | (2006.01) |

(52) U.S. Cl.
CPC .......... *H04W 4/16* (2013.01); *G06F 3/1222* (2013.01); *G06F 3/1225* (2013.01); *G06F 3/1239* (2013.01); *G06F 3/1292* (2013.01); *H04M 1/72522* (2013.01); *H04W 4/008* (2013.01); *H04W 12/10* (2013.01); *H04M 1/72525* (2013.01)

(58) Field of Classification Search
None
See application file for complete search history.

(56) References Cited

U.S. PATENT DOCUMENTS

| | | | |
|---|---|---|---|
| 7,131,067 B1 | 10/2006 | Ikeda | |
| 8,655,695 B1* | 2/2014 | Qu | G06Q 30/0251 705/14.49 |
| 8,739,284 B1* | 5/2014 | Gardner | G06F 21/55 726/24 |
| 2005/0044546 A1* | 2/2005 | Niebling | G06F 21/10 717/177 |
| 2005/0066163 A1* | 3/2005 | Ikenoya | H04L 63/0823 713/156 |

(Continued)

FOREIGN PATENT DOCUMENTS

| | | |
|---|---|---|
| JP | 2007-181140 | 7/2007 |
| JP | 2012-64030 | 3/2012 |

*Primary Examiner* — Leon-Viet Nguyen
(74) *Attorney, Agent, or Firm* — Staas & Halsey LLP

(57) ABSTRACT

A method of customizing a configuration of a printing application of a mobile terminal, a mobile terminal, and a system are provided. The method includes establishing a wireless connection with an image forming device by using tag information written on a near field communication (NFC) tag of the image forming device, receiving usage authority information representing a function allowed for a user of the mobile terminal among functions of the image forming device, and selectively installing at least one plug-in corresponding to the usage authority information among a plurality of plug-ins that the printing application supports.

22 Claims, 15 Drawing Sheets

(56) References Cited

U.S. PATENT DOCUMENTS

| | | |
|---|---|---|
| 2006/0095542 A1 | 5/2006 | Reddy et al. |
| 2007/0150738 A1 | 6/2007 | Kawai et al. |
| 2008/0175377 A1* | 7/2008 | Merrill ............... G06F 21/36 380/30 |
| 2009/0116053 A1 | 5/2009 | Selvaraj |
| 2009/0144629 A1 | 6/2009 | Ferlitsch et al. |
| 2009/0190150 A1 | 7/2009 | Selvaraj et al. |
| 2011/0041144 A1* | 2/2011 | Araki ................ G06F 9/541 719/328 |
| 2012/0281245 A1 | 11/2012 | Mitsui |
| 2013/0215467 A1* | 8/2013 | Fein ................. G06F 3/1204 358/1.15 |
| 2014/0282960 A1* | 9/2014 | Tinnakornsrisuphap H04L 63/083 726/7 |

* cited by examiner

\<NFC enabled phone\>

\<NFC enabled phone\>

FIG. 4

NDEF Message 40

| | Record Header | Type length | Payload length | ID length | Type | ID | Payload |
|---|---|---|---|---|---|---|---|
| 401 | MB=1 ME=0 CF=0 SR=1 IL=0 TNF=1 | 1 | URL length | – | URL | – | http://AppStore /MFP/A2013 /ApplicationPlugIn Manager |
| 402 | MB=0 ME=0 CF=0 SR=1 IL=0 TNF=3 | 1 | INDENTIFICATION INFORMATION LENGTH | – | TXT | – | E1-01-9A-55-C8 |
| 403 | MB=0 ME=1 CF=0 SR=1 IL=0 TNF=3 | 1 | AUTHENTICATION CODE LENGTH | – | BINARY | – | ********** |

FIG. 10

```
[START]

[FAX PLUG IN]
  -NO

[SCAN PLUG IN]
  -YES
  -FEATURE LIST
          -SCAN TO USB,
          -RESOLUTION:100/200,
          -COLOR MODE: MONO

[PRINT PLUG IN]
  -YES
  -FEATURE LIST
          -COLOR MODE: MONO

[BOX PLUG IN]
  -NO

[SYSTEM PLUG IN]
  -NO

[USER APPLICATION]
  -YES
  -FEATURE LIST
          -CALENDER

[END]
```

FIG. 11

| User | Authority | | |
|---|---|---|---|
| | Module | Support | Feature list |
| NAME: Jane<br>ID: J1<br>PW: ****<br>TEL 1: 1234<br>TEL 2: 5678<br>E-mail: Jane@email.com | FAX<br>SCAN<br>PRINT<br>BOX<br>STORAGE<br>SYSTEM MANAGER<br>USER APPLICATION | O<br>O<br>O<br>O<br>O<br>O | ALL<br>ALL<br>ALL<br>ALL<br>ALL<br>ALL<br>ALL — A05 |
| NAME: John<br>ID: J2<br>PW: ****<br>TEL 1: 4321<br>TEL 2: 8765<br>E-mail: John@email.com | FAX<br>SCAN<br>PRINT<br>BOX<br>STORAGE<br>SYSTEM MANAGER<br>USER APPLICATION | X<br>O<br>O<br>X<br>X<br>X<br>O | EMPTY<br>SCAN TO USB, RES:100/200, MONO<br>MONO<br>EMPTY<br>EMPTY<br>EMPTY<br>CALANDER — A10 |

FIG. 12

- ☑ SCAN
    - ☑ SCAN TO SMB
    - ☑ SCAN TO FTP
    - ☐ SCAN TO USB
    - ☑ RESOLUTION
        - ☑ 100
        - ☑ 200
        - ☑ 300
        - ☐ 400
        - ☐ 600
    - ☑ COLOR MODE
        - ☑ AUTO
        - ☑ COLOR
        - ☑ MONO
    - ☑ ADVANCED
        - ☐ BOOK
        - ☑ WATERMARK
- ☑ PRINT
    - ☑ COLOR MODE
        - ☑ MONO
- ☑ USER APPLICATION
    - ☑ CALANDER

METHOD AND DEVICE FOR CUSTOMIZING CONFIGURATION OF PRINTING APPLICATION

CROSS-REFERENCE TO RELATED APPLICATIONS

This application is related to, and claims the priority benefit of, Korean Patent Application No. 10-2013-0119456, filed on Oct. 7, 2013, in the Korean Intellectual Property Office, the disclosure of which is incorporated herein in its entirety by reference.

BACKGROUND

1. Field

One or more embodiments relate to a method and device for customizing a printing application according to a user.

2. Description of the Related Art

As mobile communication technologies are developed and mobile communication terminals spread, mobile terminals, for example, smartphones, tablet PCs, and PDAs are replacing the roles of past personal computers. In the field of image forming devices, for example, a printer, a scanner, a fax machine, or a multi-function peripheral (MFP), a technology for directly using an image forming device without going through a PC is under development.

In order to directly use an image forming device in a mobile terminal, it may be necessary to install a printing application on the mobile terminal. However, the printing application has a limitation in providing a user customized work environment. For example, if a user does not have permission to use a copy function in an image forming device, to save resources of a mobile terminal and provide user convenience, it may be necessary to configure a printing application besides a copy function. However, all the functions of a currently available printing application may be installed and executed regardless of a user's authority.

SUMMARY

One or more embodiments provide a method of customizing a configuration of a printing application automatically according to a user's authority and a mobile terminal performing the same.

One or more embodiments provide a method of customizing a configuration of a printing application of a mobile terminal and an image forming device performing the same.

Additional aspects will be set forth in part in the description which follows and, in part, will be apparent from the description, or may be learned by practice of the presented embodiments.

According to one or more embodiments, a method of customizing a configuration of a printing application of a mobile terminal is provided. The method includes establishing a wireless connection with an image forming device by using tag information written on a near field communication (NFC) tag of the image forming device, receiving usage authority information representing a function allowed for a user of the mobile terminal among functions of the image forming device, and selectively installing at least one plug-in corresponding to the usage authority information among a plurality of plug-ins that the printing application supports.

According to one or more embodiments, a supporting method of an image forming device to customize a printing application of a mobile terminal is provided. The method includes receiving user identification information of the mobile terminal from the mobile terminal, and transmitting usage authentication information representing a function allowed for a user of the mobile terminal among functions of the image forming device in response to the received user identification information, wherein the mobile terminal selectively installs at least one plug-in corresponding to the usage authority information among a plurality of plug-ins that the printing application supports.

According to one or more embodiments, a mobile terminal includes a near field communication (NFC) module obtaining tag information written on an NFC tag of an image forming device, a wireless communication module establishing a wireless connection with the image forming device by using the tag information and receiving usage authority information representing a function allowed for a user of the mobile terminal among functions of the image forming device, and a control unit installing a printing application by using a uniform resource locator (URL) included in the tag information and selectively installing a plug-in corresponding to the usage authority information among a plurality of plug-ins that the printing application supports.

According to one or more embodiments, a system includes an image forming device and a mobile terminal, wherein the image forming device receives user identification information of the mobile terminal from the mobile terminal and transmits usage authority information representing a function allowed for a user of the mobile terminal among functions of the image forming device in response to the received user identification information, and the mobile terminal selectively installs at least one plug-in corresponding to the usage authority information among a plurality of plug-ins that the printing application supports.

BRIEF DESCRIPTION OF THE DRAWINGS

These and/or other aspects will become apparent and more readily appreciated from the following description of the embodiments, taken in conjunction with the accompanying drawings in which:

FIG. 4 illustrates an NFC Data Exchange Format (NDEF) message according to an embodiment;

FIG. 10 illustrates usage authority information according to an embodiment;

FIG. 11 illustrates a data structure of a user database, according to an embodiment;

FIG. 12 illustrates a plug-in installation list according to an embodiment;

DETAILED DESCRIPTION

Hereinafter, embodiments will be described in more detail with reference to the accompanying drawings.

Figure 1A:
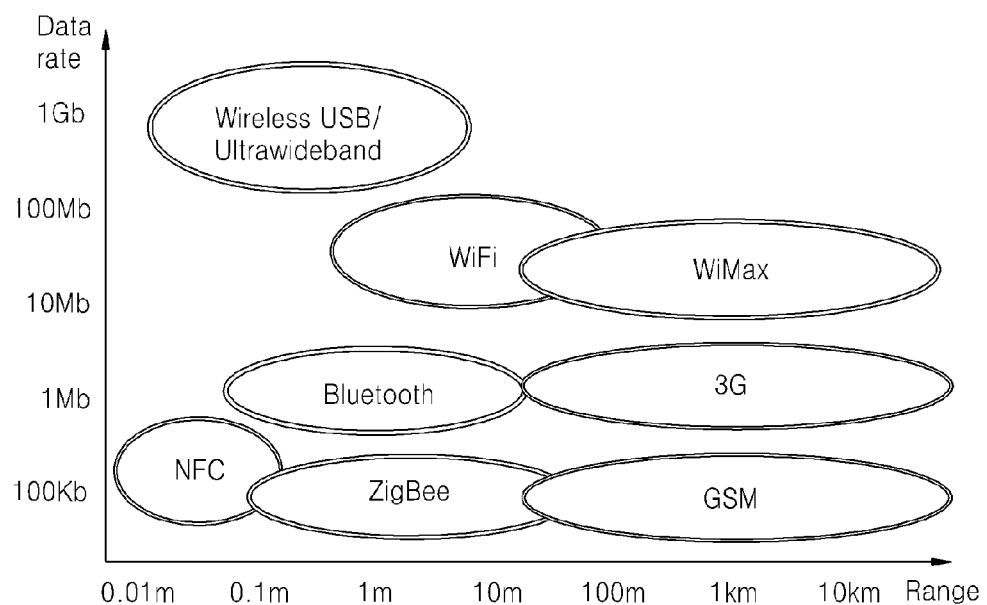
FIG. 1A is a graph illustrating a comparison of exemplary data rates and communication ranges of NFC and other wireless communication methods.

FIG. 1A illustrates exemplary data rates and communication ranges of near field communication (NFC) and other wireless communication methods. Referring to FIG. 1A, compared to the other wireless communication methods, an NFC coverage is in a range of about 10 cm. Unlike Bluetooth or Wi-Fi having a coverage from a few meters to tens of meters, NFC has a coverage of extremely short distances (for example, about 10 cm).

Moreover, NFC may be compared with other wireless communication methods, such as Bluetooth and ZigBee, as illustrated in Table 1.

TABLE 1

| Technology | Usage frequency | Security | Standard range | Main service area |
|---|---|---|---|---|
| NFC | 13.56 MHz | Encryption applied | International Standards | Non-contact payment, RFID, File transmission |
| Bluetooth | 2.4 GHz | Not applied | International Standards | File transmission |
| ZigBee | 2.4 GHz | Not applied | International Standards | Device control, RFID |
| 900 MHz RFID | 900 MHz | Not applied | National standards (KR) | RFID |

That is, compared to other wireless communication methods, NFC has a coverage of less than about 10 cm and encryption technology, and thus has a high security level. Accordingly, when NFC is combined with other high-speed wireless communication methods, for example, 3G, 4G, and Wi-Fi, and used, efficient communication between devices is available. For example, when NFC technology and Bluetooth technology are combined, because NFC technology is used for connection (authentication) between devices and Bluetooth technology is used for data transmission between devices, efficient communication between devices is available.

Figure 1B:
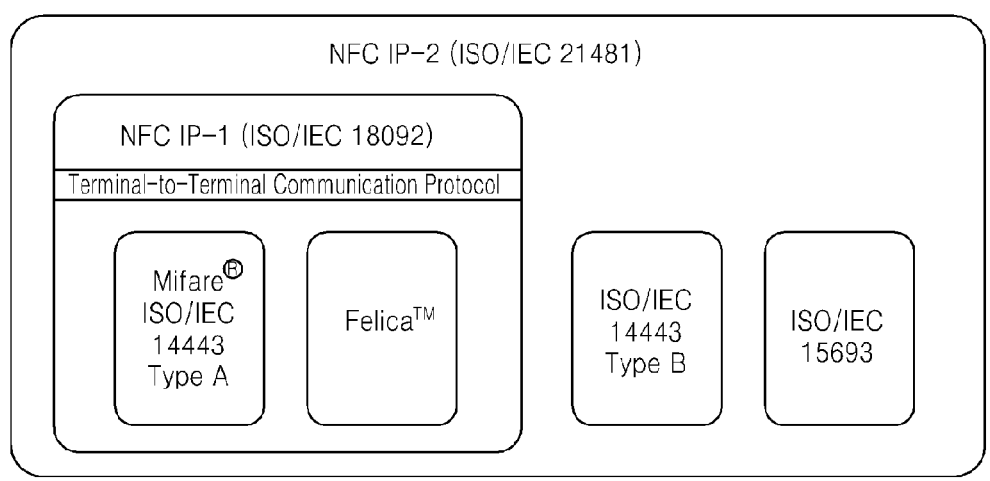
FIG. 1B illustrates exemplary standards related to NFC technology.

FIG. 1B illustrates exemplary standards related to NFC technology.

Referring to 1B, NFC standard technology follows International Organization for Standardization (ISO) and extends ISO 14443 Proximity-card Standard, and includes NFC Interface Protocol-1 (NFC IP-1) (ISO/IEC 18092) and NFC IP-2 (ISO/IEC 21481) standards. Herein, ISO/IEC 14443 Type A and Type B, FeliCa, ISO/IEC 15693 are the international standards of four divisions for a proximity-card operating at about 13.56 MHz. Also, the ISO/IEC 18092 standard defines a communication mode for NFC interface and protocol.

Figure 2A:
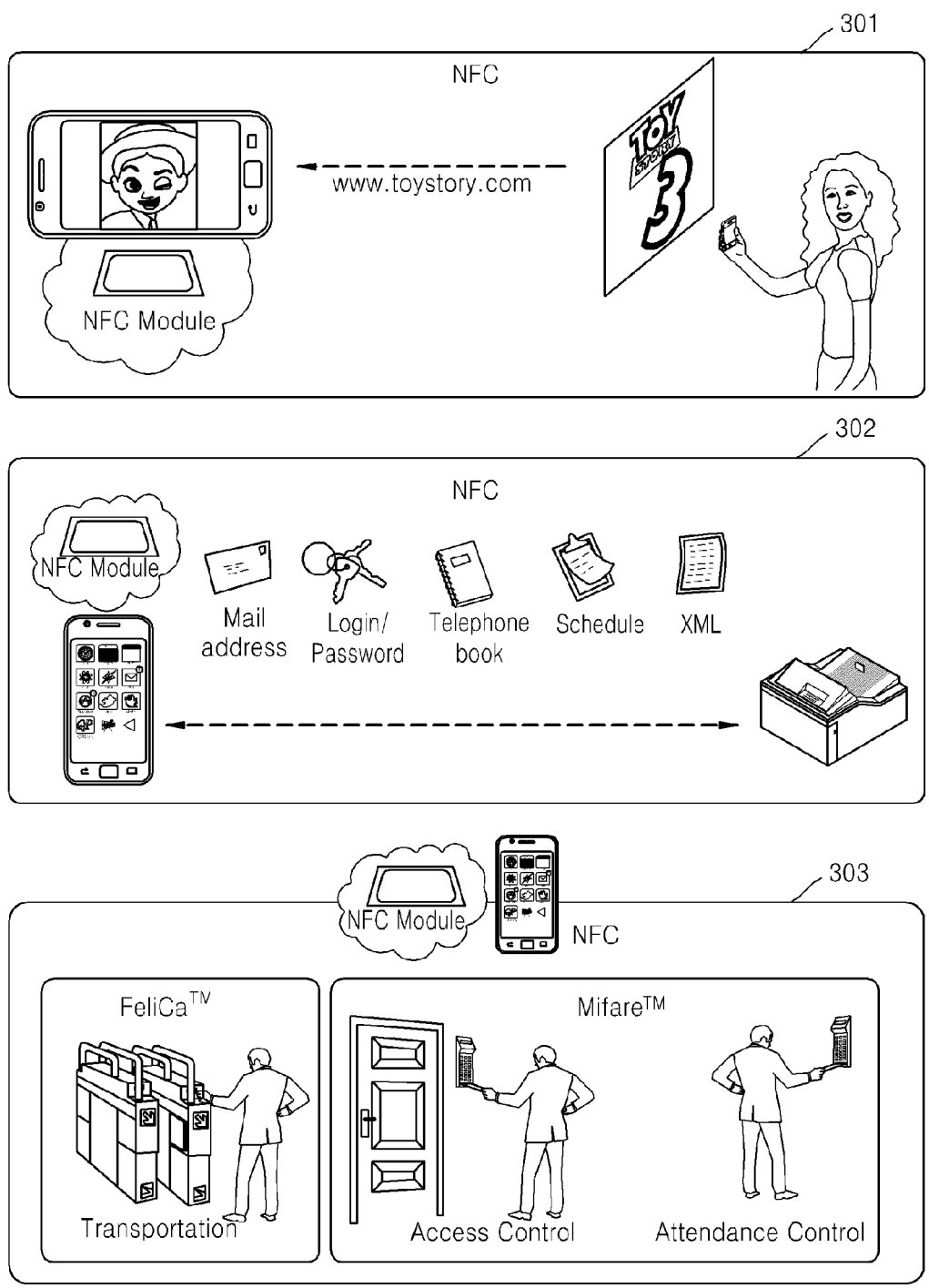
FIGS. 2A and 2B are views illustrating exemplary NFC communication modes.
Figure 2B:
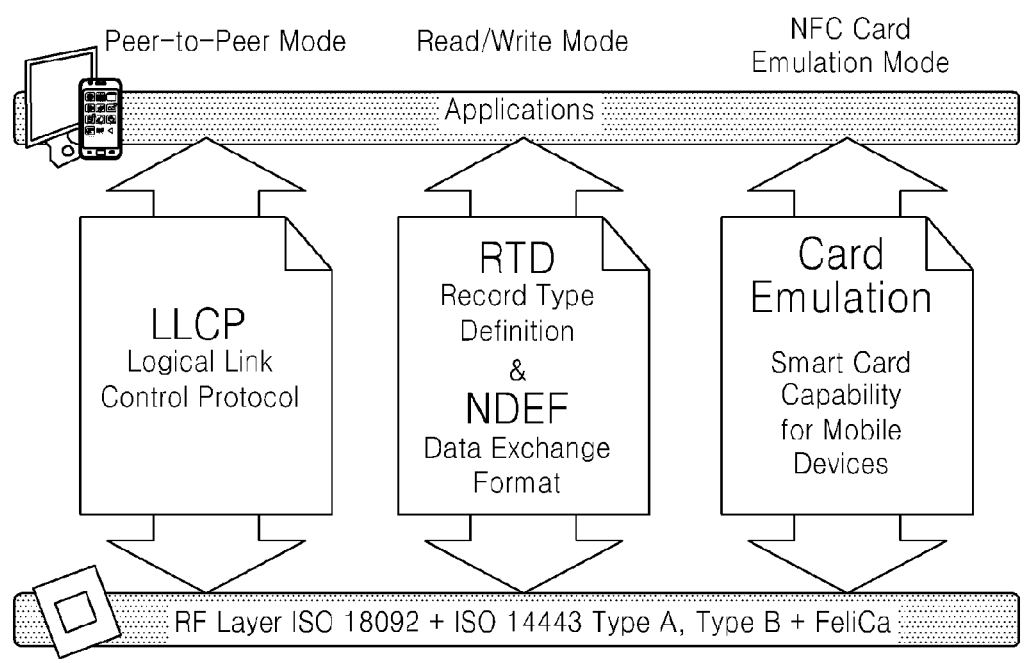

FIGS. 2A and 2B are views illustrating exemplary NFC communication modes.

Referring to 2A, the NFC forum classifies main communication modules of NFC into three modes of a Reader/Writer mode 301, a P2P mode 302, and a Card Emulation mode 303 and standardizes them. Exemplary NFC communication modes are summarized in Table 2.

TABLE 2

|  | ISO/IEC 15693 | ISO/IEC 18092 | ISO/IEC 14443 |
|---|---|---|---|
| Operation mode | Communication between reader and tag (VCD2 mode) | Communication between devices (P2P mode) | Communication between reader and tag (PCD1 mode) |
| Power supply | Passive | Active and passive | passive |
| Communication range | 1 m | 10~20 cm | 10 cm |
| Data speed | 26 kbps or less | 106, 212, 424 Kbps | 106 kbps |

(PCD: Proximity Coupling Device, VCD: Vicinity Coupling Device)

According to the Reader/Writer mode 301, a device with a built-in NFC chipset operates as a reader for reading an NFC tag or operates as a writer for writing information to an NFC tag. A device with a built-in NFC chipset and the NFC tag may be separated from each other. The NFC tag may be on the outside of a device operating in a Reader/Writer mode. For example, the NFC tag may be a passive tag included or attached to another device. If another device does not have an NFC chipset, it may not read/write information from/to an attached passive tag. If the NFC tag is an active tag included in another device, it may be possible for the other device to read/write information from/to the NFC tag through an NFC function. Although it may be difficult for the active tag to later be installed on a device not supporting an NFC function, the passive tag may be later detached/attached from/to a device not supporting an NFC function.

The P2P mode 302 is a mode supporting two-way communication between two NFC devices. To establish connection, a client (for example, an NFC P2P initiator) searches for a host (for example, an NFC P2P target) and transmits data in an NDEF message format. According to the P2P mode 302, data exchange between devices is possible but since a data transmission rate is up to about 424 Kbps or less, data exchange of a relatively small size is appropriate.

The Card Emulation mode 303 is a mode in which a mobile terminal 20 with a built-in NFC tag operates as if a smart card (following ISO/IEC 14443) operated. Accordingly, ISO 14443, that is, the international standard of a proximity-card, of course, is compatible with Felica of SONY or MiFare of Philips.

To provide the three exemplary NFC communication modes properly, a protocol may be standardized as illustrated in FIG. 2B. Referring to FIG. 2B, the S/W configuration in an NFC system is illustrated.

Logical Link Control Protocol (LLCP) is a protocol responsible for the role of communication connection and control between layers. A NFC Data Exchange Format (NDEF) message is a basic message structure defined in the NFC communication protocol. NDEF defines a record format for message exchange between a device and a tag compatible with the NFC forum and is a standard exchange format for a Uniform Resource Identifier (URI), a smartposter, and other things. The NDEF message includes at least one NDEF record. The NDEF record includes a payload described as a type, a length, and an option identifier. The NDEF payload may be defined as application data in the NDEF record. Record Type Definition (RTD) defines a record type and a type name corresponding to the NDEF record.

Figure 3A:
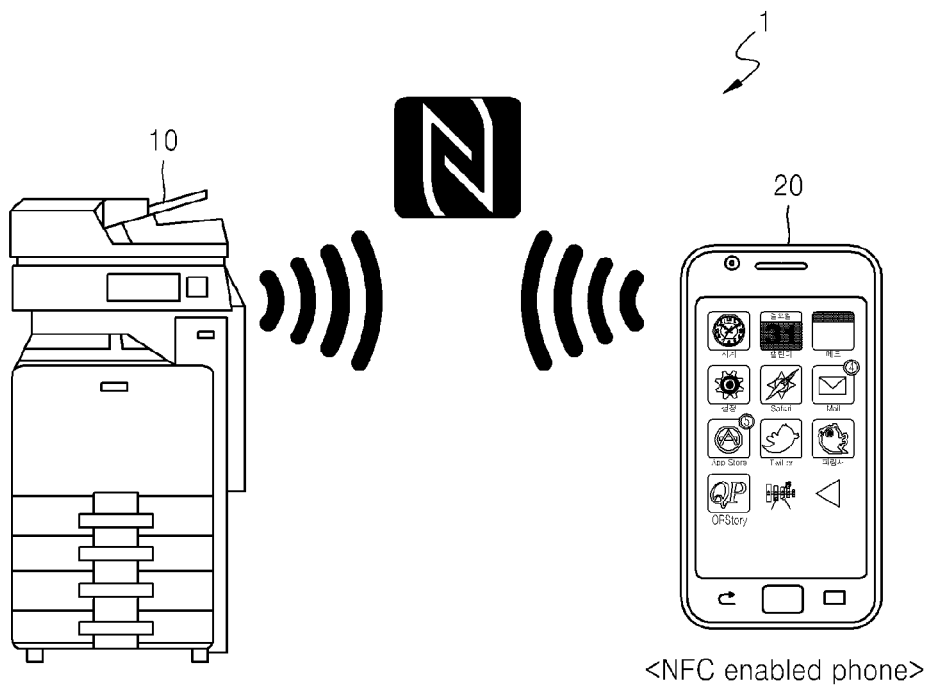
FIG. 3A illustrates an NFC environment according to an embodiment.

FIG. 3A illustrates an NFC environment 1 according to an embodiment. FIG. 3A illustrates an image forming device 10 supporting an NFC function and a mobile terminal 20 supporting an NFC function in the NFC environment 1. Since the image forming device 10 illustrated in FIG. 3A has a prebuilt-in NFC chipset, it may operate with the mobile terminal 20 in the P2P mode 302 using the NFC function. However, those skilled in the art may understand that the image forming device 10 illustrated in FIG. 3A may operate in the Reader/Writer mode 301 and the Card Emulation mode 303 in addition to the P2P mode 302.

Figure 3B:
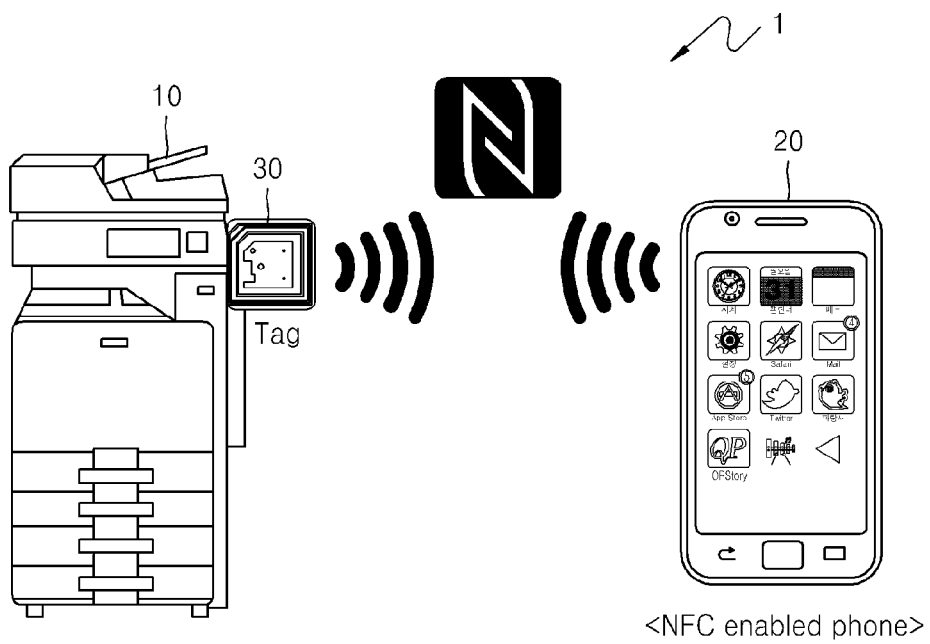
FIG. 3B illustrates an NFC environment according to an embodiment.

FIG. 3B illustrates an NFC environment 1 similar to that of FIG. 3A, according to an embodiment. FIG. 3B illustrates an image forming device 10 supporting an NFC function and a mobile terminal 20 supporting an NFC function in the NFC environment 1. The image forming device 10 of FIG. 3A uses an NFC chipset but the image forming device 10 of FIG. 3B uses an NFC tag 30. If the NFC chipset is used, it may include all functions of the NFC tag 30. For example, if the NFC chipset operates in the Card Emulation mode 303, it may perform the same function as the NFC tag 30. A function of the NFC tag 30 includes transmitting information written on the NFC tag 30 to the mobile terminal 20 through near field wireless communication.

The NFC tag 30 may be a read/write tag, not a read only write once tag, in order to perform a write and modify operation through the mobile terminal 20 or the image forming device 10 of FIG. 3B. The read only tag is a tag having a physical property that once data is written, modification cannot be made, and a read/write tag is a tag having a physical property that a writer is capable of deleting and modifying data that is recorded once. Thus, these tags are different from the passive and active tags conceptually.

The NFC tag 30 needs to be an active tag to be written or modified by the image forming device 10 of FIG. 3B. In order for the NFC tag 30 to operate as an active tag, a transmission line or an NFC chipset for data transmission of an IC of the NFC tag 30 and the image forming device 10 of FIG. 3C may need to be included in the image forming device 10 of FIG. 3B.

Accordingly, when the NFC tag 30 is attached to a typical image forming device not equipped with a transmission line or an NFC chipset, it operates as a passive tag, not an active tag. When the NFC tag 30 operates as a passive tag, the mobile terminal 20 may read or modify the information written on the NFC tag 30, but the image forming device 10 of FIG. 3B may not read or modify the information written on the NFC tag 30. When the NFC tag 30 operates as an active tag, both the mobile terminal 20 and the image forming device 10 may read or modify the information written on the NFC tag 30. Since the active tag includes all the functions of the passive tag, it is advantageous in terms of function, but the passive tag may more easily be installed on a typical image forming device than the active tag.

In the description below, it is assumed that the image forming device 10 of FIG. 3B is not equipped with the built-in NFC tag 30 while being manufactured. Accordingly, only when the NFC tag 30 is later installed on the image forming device 10 of FIG. 3B, the image forming device 10 of FIG. 3B may communicate with the mobile terminal 20 through an NFC function. The image forming device 10 may include at least one slot for installing the active or passive NFC tag 30 later.

It is apparent those skilled in the art that if the NFC tag 30 is later installed as an active tag to the image forming device 10 of FIG. 3B later, an operation of the NFC environment 1 may be identical to that of FIG. 3A.

For convenience of description, although one pair of the image forming device 10 and the mobile terminal 20 in the NFC environment is described, it is apparent to those skilled in the art that there may be different kinds of electronic devices supporting an NFC function in the NFC environment 1 and they operate in a similar manner as that of this embodiment.

Figure 3C:
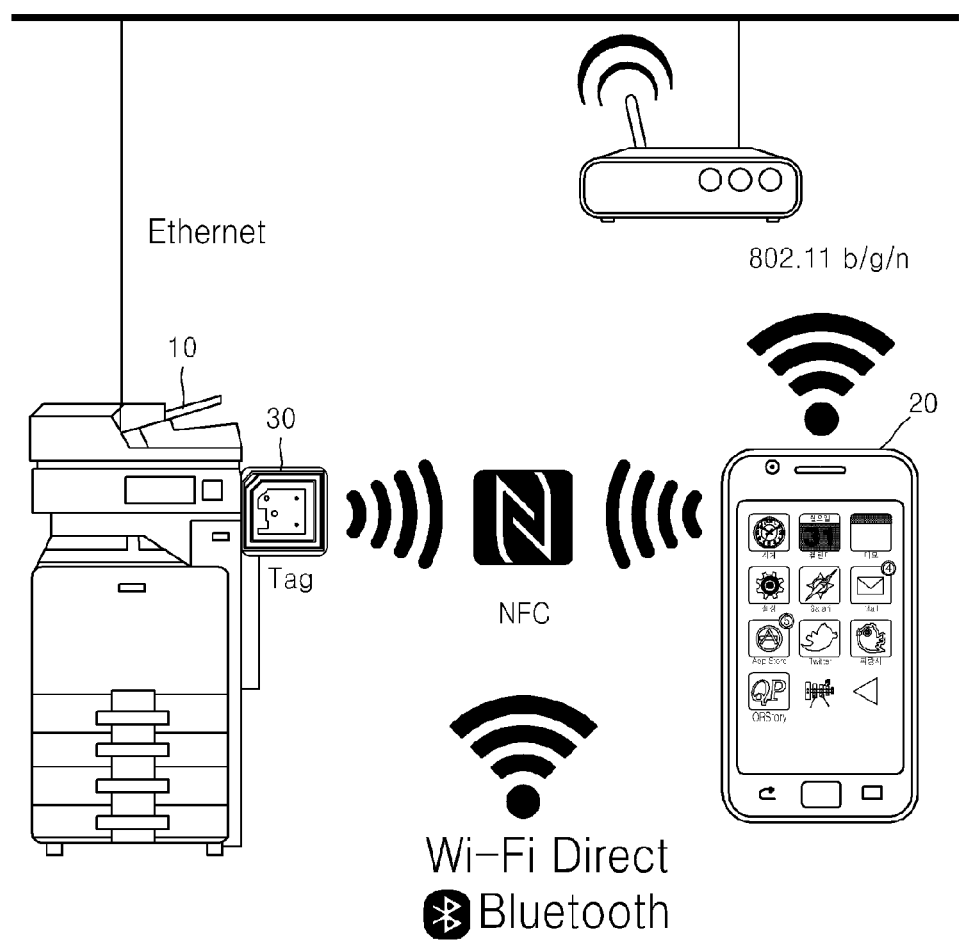
FIG. 3C illustrates a wireless communication environment including an image forming device and a mobile terminal, according to an embodiment.

FIG. 3C illustrates a wireless communication environment 2 including an image forming device 10 and a mobile terminal 20, according to an embodiment. Referring to FIG. 3C, other peripheral wired/wireless networks are illustrated together with an NFC environment 1 of FIG. 3B. The NFC environment 1 of FIG. 3B may operate in linkage with a peripheral wired/wireless network, for example, Wi-Fi Direct, Bluetooth, Ethernet, or 802.11a/b/g/n. In the wireless communication environment 2, the image forming device 10 may be connected to the mobile terminal 10 through WiFi Direct, or the image forming device 10 may be connected to the mobile terminal 10 through a wired/wireless network via WiFi AP (802.11a/b/g/n).

FIG. 4 illustrates an NDEF message 40 according to an embodiment. The NDEF message 40 of FIG. 4 may be written on the NFC tag 30. According to an embodiment, the NDEF message 40 of FIG. 4 may be provided in the P2P mode 302 to the mobile terminal 20 through the NFC module 170 of the image forming device 10. Tag information may be the NDEF message 40.

Referring to FIG. 4, the NDEF message 40 may include a plurality of NDEF records. Each NDEF record includes a record header, a type length, a payload length, an ID length, a type, an ID, and a payload.

The NDEF message 40 includes at least one of a first NDEF record 401, a second NDEF record 402, and a third NDEF record 403. A URL for installation of a printing application may be written on the first NDEF record 401. In the first NDEF record 401, a record header and "MB=1 ME=0 CF=0 SR=1 IL=0 TNF=1'" are a type predefined by the NFC standard and indicate that the first NDEFrecord 401 is URL information. A URL address, for example, "http://AppStore/MFP/A2013/ApplicationPlugInManager", is written on the payload. The URL address written on the payload is the address of the installation file of a printing application installed on the mobile terminal 20. Accordingly, when the mobile terminal 20 accesses the URL address written on the payload, it may download the installation file of a printing application.

The identification information of the image forming device 10 may be written on the second NDEF record 402. The header of the second NDEF record 402, that is, "TNF=3", indicates that the information written on the second NDEF record 402 is an external type not defined by the NFC standard. Information on a wireless connection method, for example, a MAC address, an IP address, a model name, a device capacity, and WiFi/WiFi-direct, may be written as the identification information of the image forming device 10 on the payload of the second NDEF record 402. The mobile terminal 20 may establish wireless connection with the image forming device 10 by using the information written on the second NDEF record 402. A process of establishing wireless connection between the mobile terminal 20 and the image forming device 10 is disclosed.

An authentication code for establishing wireless connection with the image forming device 10 is written on the third NDEF record 403. The header of the third NDEF record 403, that is, "TNF=3"', indicates that the information written on the third NDEF record 403 is an external type not defined by the NFC standard. For example, a Personal Identification Number (PIN) for Wi-Fi Protected Setup (WPS) authentication may be written on the payload of the third NDEF record 403. The PIN may be encrypted and written. The mobile terminal 20 may perform WPS authentication with the image forming device 10 by using the third NDEF record 403 without receiving an input of an authentication code from a user.

Figure 5:
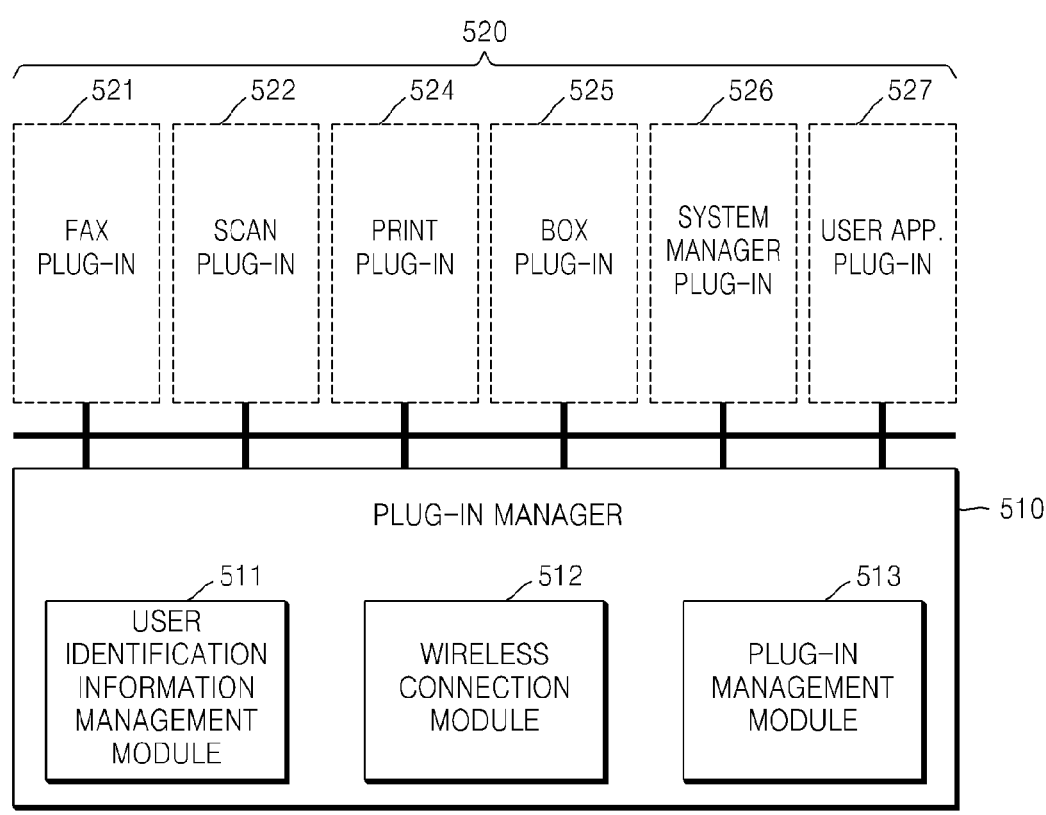
FIG. 5 illustrates a printing application according to an embodiment.

FIG. 5 illustrates a printing application 50 according to an embodiment. Since the printing application 50 illustrated in FIG. 5 is executed in the mobile terminal 20, an operation of the printing application 50 may be understood as an operation of the mobile terminal 20.

Referring to FIG. 5, the printing application 50 includes a plug-in manager 510 and a plurality of plug-ins 520. The plug-in manager 510 provides a software platform for executing the plug-ins 520. The plug-in manager 510 may be understood as the framework of the printing application 50. When the printing application 50 is installed on the mobile terminal 20 first, only the plug-in manager 510 may be installed and the plug-ins 520 may be added for function expansion of the printing application 50. However, all the plug-ins 520 may not be added and if necessary, some of the plug-ins 520 may be selectively installed. Accordingly, as a configuration of the printing application 50 is customized, the dashed-line configurations of the plug-ins 520 may be omitted or added.

The plug-in manager 510 includes a user identification management module 511, a wireless connection module 512, and a plug-in management module 513.

The wireless connection module 512 establishes a wireless connection with the image forming device 10. The wireless connection module 512 parses the second NDEF record 402 of the NDEF message 40 to obtain the identification information of the image forming device 10. The wireless connection module 512 searches for the image forming device 10 by using the identification information of the image forming device 10.

The wireless connection module 512 receives a signal transmitted from the image forming device 10 by performing a device discovery operation. In an environment including a plurality of WiFi or WiFi-direct devices (hereinafter referred to as candidate devices), the image forming device 10 needs to be identified from candidate devices.

The wireless connection module 512 may distinguish other candidate devices from the image forming device 10 by using the identification information of the image forming device 10. For example, in the case of WiFi-Direct connection, a wireless connection signaling of the image forming device 10 may be identified by selecting a candidate device having a MAC address of the image forming device 10. If the identification information of the image forming device 10 is a MAC address or an IP address, the wireless connection module 512 may identify a WiFi-direct signal transmitted from the image forming device 10 having the same MAC address as the second NDEF record 402 from among the found WiFi-direct candidate devices.

In the case of WiFi instead of WiFi-direct, the wireless connection module 512 may connect to the image forming device 10 through WiFi via an AP (802.11b/g/n) among the WiFi candidate devices connected to the AP (802.11b/g/n) by using the identification information of the image forming device 10. The mobile terminal 20 obtains information on an MAC address or an IP address of candidate devices from the AP (802.11b/g/n), and determines whether the image forming device 10 having the same MAC address or IP address as the second NDEF record 402 exist in the AP (802.11b/g/n).

The wireless connection module 512 performs a response signaling operation on the identified wireless connection signaling. That is, the wireless connection module 512 may perform an authentication operation necessary for wireless connection with the image forming device 10 through the response signaling operation. The wireless connection module 512 parses the third NDEF record 403 of the NDEF message 40 to obtain an authentication code. The wireless connection module 512 performs WPS authentication with the image forming device 10 by transmitting the authentication code to the image forming device 10. The image forming device 10 performs the WPS authentication operation by comparing a PIN value set in the image forming device 10 with the authentication code received from the mobile terminal 20.

Accordingly, even if a user does not input a PIN directly or does not press a WPS button of the image forming device 10, an authentication operation necessary for wireless connection with the image forming device 10 may be performed automatically. Moreover, in the case of WiFi instead of WiFi-direct, an authentication operation with the AP (802.11b/g/n) may be performed for wireless connection to the AP (802.11b/g/n).

The wireless connection module 512 determines whether the authentication operation is successful by receiving an authentication success message or an authentication failure message. If the authentication operation is successful, the mobile terminal 20 receives an allocated IP address for WiFi-direct from the image forming device 10. In the case of WiFi instead of WiFi-direct, an IP address is allocated from the AP (802.11b/g/n).

The user identification information management module 511 collects user identification information stored in the mobile terminal 20. For example, the user identification information may include at least one of a user's e-mail or phone number of the mobile terminal 20 and an ID and password of a user account of the image forming device 10. The user identification information management module 511 transmits the user identification information collected by the mobile terminal 20 to the image forming device 10. The user identification information management module 511 transmits the user identification information to the image forming device 10 by using a wireless connection established through the wireless connection module 512.

The plug-in management module 513 installs, executes, deletes, or activate/deactivate the plug-ins 520. The plug-in management module 513 selects at least part of a plug-in from the installation files of the plug-ins 520 and installs it. A method of selecting a plug-in that the plug-in management module 513 installs is disclosed.

According to an embodiment, the installation files of the plug-ins 520 may be obtained from the URL of the first NDEF record 401. The installation file of the plug-in manager 510 and the installation files of the plug-ins 520 may be downloaded together from the URL of the first NDEF record 401. According to an embodiment, the installation file of the plug-in manager 510 and the installation files of the plug-ins 520 may be downloaded separately from the URL of the first NDEF record 401. For example, the installation file of the plug-in manager 510 is downloaded first, and the plug-in manager 510 is installed. If a plug-in to be installed is determined, only the installation file of the plug-in to be installed may be downloaded from the URL of the first NDEF record 401.

According to an embodiment, the installation files of the plug-ins 520 may be downloaded from a network address that is different from the URL of the first NDEF record 401. For example, the plug-in management module 513 may download the installation files of the plug-ins 520 from a predetermined network address.

The plug-ins 520 correspond to separate functions of the image forming device 10, respectively. For example, when the image forming device 10 has fax, scan, printing, document box, and system manager functions, a fax plug-in 521, a scan plug-in 522, a print plug-in 524, a box plug-in 525, a system manager plug-in 526 corresponds to the functions of the image forming device 10, respectively. Accordingly, in order for the mobile terminal 20 to use a fax function of the image forming device 10, the fax plug-in 521 needs to be installed. A user application plug-in 527 is a plug-in for using a predetermined application developed by a user of the image forming device 10 or a third party.

Each of the plug-ins 520 may include a plurality of detailed function modules. The detailed function module may be referred to as a feature.

Figure 6:
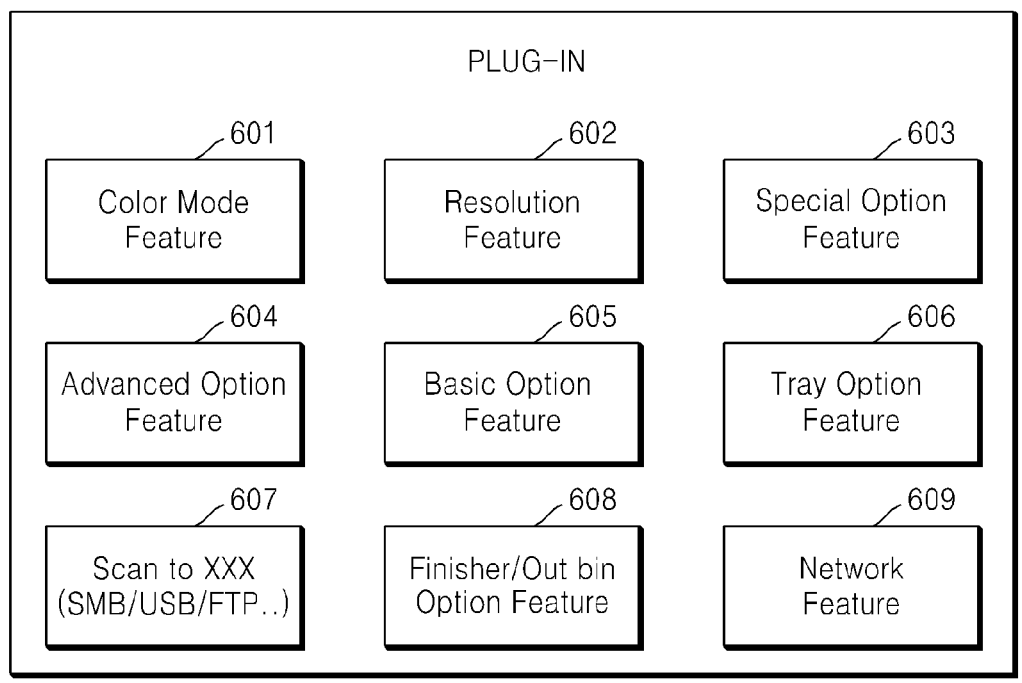
FIG. 6 illustrates a plug-in according to an embodiment.

Referring to FIG. 6, a plug-in 60 includes a color mode feature 601, a resolution feature 602, a special option feature 603, an advanced option feature 604, a basic option feature 605, a tray option feature 606, a scan feature 607, a finisher/out bin option feature 608, and a network feature 609. It may be apparent to those skilled in the art that the plug-in 60 may be one of the plug-ins 520 of FIG. 5, the features of FIG. 6 may not necessarily always be included, and features may vary according to a type of the plug-in 60.

The plug-in management module 513 may install the entire plug-in 60 but may select and install only a necessary feature. For example, if a user of the mobile terminal 20 does not have an authority to use an advanced option, the installation of the advanced option feature 604 may be omitted. If a user of the mobile terminal 20 has an authority to use a scan function, but a resolution is about 200 dpi or less, the plug-in management module 513 may omit an installation of a portion of the resolution feature 602 corresponding to a resolution of more than about 200 dpi.

Figure 7:
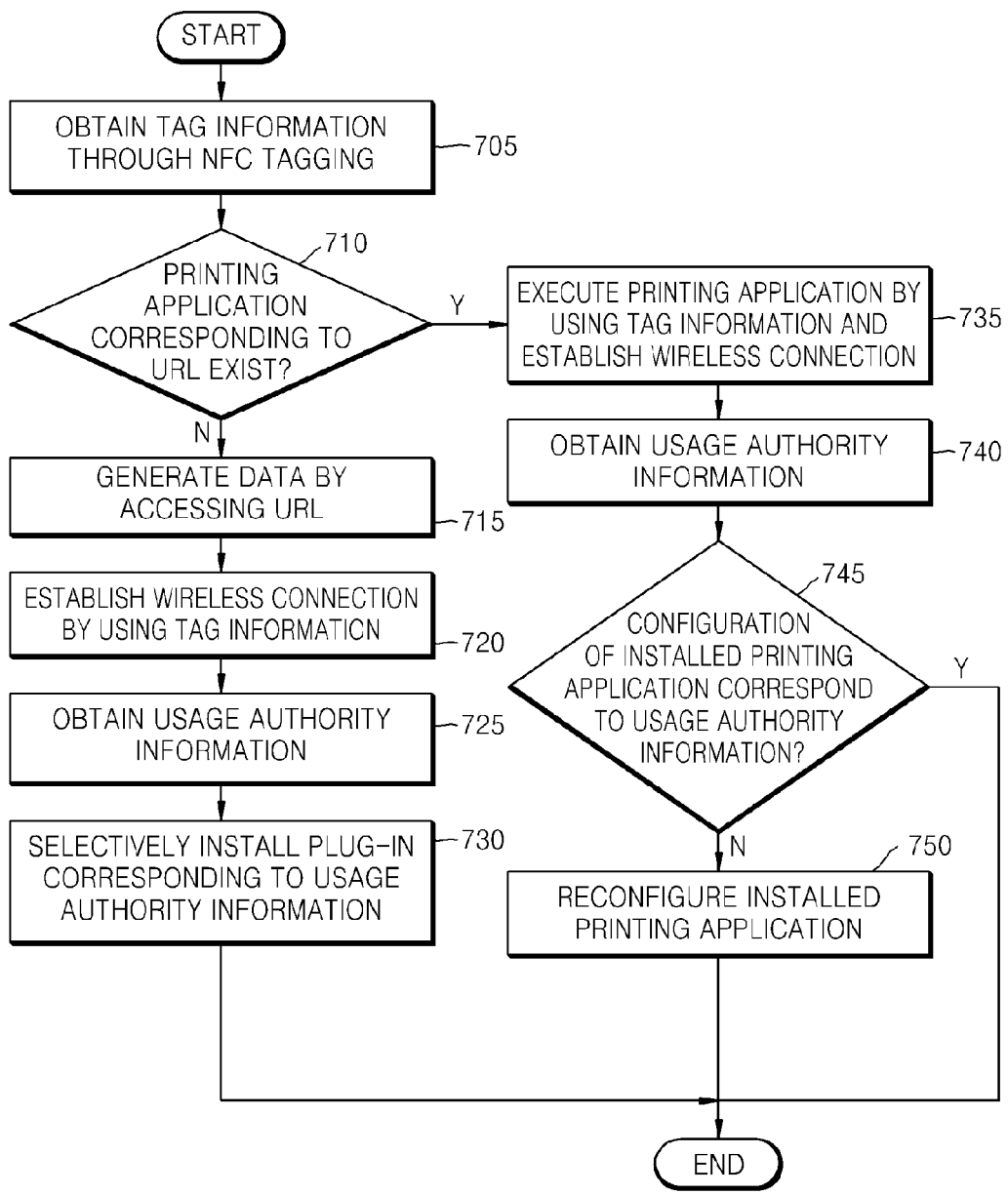
FIG. 7 is a flowchart of a method of customizing a configuration of a printing application, according to an embodiment.

FIG. 7 is a flowchart of a method of customizing a configuration of a printing application, according to an embodiment.

Referring to FIG. 7, the mobile terminal 20 obtains tag information written on the NFC tag 30 through NFC tagging in operation 705. The tag information may be the NDEF message 40 illustrated in FIG. 4.

The mobile terminal 20 determines whether the printing application 50 corresponding to a URL included in the tag information exists in the mobile terminal 20 in operation 710. Applications installed on the mobile terminal 20 include URL information for installing and updating the respective applications. Accordingly, the mobile terminal 20 determines whether the printing application 50 exists among the applications installed on the mobile terminal 20.

If it is determined that the printing application 50 does not exist in the mobile terminal 20, the mobile terminal 20 accesses the URL included in the tag information and installs the printing application 50 in operation 715. The mobile terminal 20 accesses the URL included in the tag information and downloads and executes the installation file of the printing application 50.

In operation 715, the mobile terminal 20 may download only the installation file of the plug-in manager 510 in the printing application 50. Accordingly, the installation files of the plug-ins 520 may not be downloaded. A reason for this is that there may be a plug-in not to be installed among the plug-ins 520.

According to an embodiment, the mobile terminal 20 may download the installation file of the plug-in manager 510 and the installation files of the plug-ins 520 together in operation 715. However, the mobile terminal 20 may not install the plug-ins 520 but install only the plug-in manager 510.

The mobile terminal 20 executes the printing application 50 once the printing application 50 is installed. For example, the mobile terminal 20 executes the plug-in manager 510 but not the plug-ins 520.

The mobile terminal 20 establishes a wireless connection with the image forming device 10 by using the tag information. The mobile terminal 20 searches for the image forming device 10 by using the identification information of the image forming device 10 that may be included in the tag information. When the image forming device 10 is found, the mobile terminal 20 performs an authentication operation necessary for wireless connection with the image forming device 10 by using the authentication code included in the tag information. Once the authentication operation is successful, a wireless connection between the mobile terminal 20 and the image forming device 10 is established.

The mobile terminal 20 obtains usage authority information from the image forming device 10 in operation 725. The usage authority information represents a function allowed for a user of the mobile terminal 20 among functions of the image forming device 10. The mobile terminal 20 may transmit the user identification information stored in the mobile terminal 20 to the image forming device 10 in order to obtain the usage authority information. The image forming device 10 generates user authority information by using the user identification information received from the mobile terminal 20. The image forming device 10 transmits the generated usage authority information to the mobile terminal 20.

The usage authority information may be a script classifying a function allowed for a user as a plug-in unit. For example, the user authority information may represent plug-ins to be installed and a function allowed for a user as a tree structure. FIG. 10 is a view of usage authority information according to an embodiment. Referring to FIG. 10, a plug-in to be installed among the plug-ins 520 is indicated with "YES" and a plug-in not to be installed is indicated with "NO". A "FEATURE LIST" is added to plug-ins to be installed and represents features that the plug-ins are to install. Referring to FIG. 10, functions allowed for a user of the mobile terminal 20 are a scan function, a printing function, and a user application function. A user of the mobile terminal 20 is not capable of using the entire scan function and is capable of using only a function of "SCAN TO USB" in a 100 dpi or 200 dpi black and white resolution.

The mobile terminal 20 selectively installs a plug-in corresponding to usage authority information among the plug-ins 520 in operation 730. For example, the mobile terminal 20 selects and installs the scan plug-in 522, the print plug-in 524, and the user application plug-in 527. Additionally, all the features are not installed from the scan plug-in 522 and features are installed on use "SCAN TO USB" in a 100 dpi or 200 dpi black and white resolution.

However, when the installation files of the plug-ins 520 are downloaded to the mobile terminal 20 in advance, the mobile terminal 20 installs only a necessary plug-in from the installation files of the plug-ins 520. When there are no installation files of the plug-ins 520 in the mobile terminal 20, the mobile terminal 20 downloads only the installation file of a plug-in corresponding to usage authority information. A download address may be a URL included in the tag information but the present invention is not limited thereto.

Since only a necessary plug-in among the plug-ins 520 is installed, the graphical user interface (GUI) of the printing application 50 is customized according to a user. Accordingly, the mobile terminal 20 does not display a menu item for an unavailable function on the printing application 50 and provides a GUI optimized for a user's authority.

For example, when a user logs in the image forming device 10, the image forming device 10 configures its GUI to display only functions allowed for a user. A GUI of the printing application 50 of the mobile terminal 20 is configured to display only functions allowed for a user. Accordingly, the GUI of the printing application 50 and the GUI of the image forming device 10 may be displayed similar or identical to each other. Even if a user uses the printing application 50 for the first time, if the user has experience with the image forming device 10, the user may easily and conveniently use the printing application 50.

Moreover, when plug-ins are installed, the mobile terminal 20 may display only a list of plug-ins corresponding to the usage authority information. The mobile terminal 20 displays a list of all the plug-ins installable according to the usage authority information and receives a selection on at least one plug-in among all the plug-ins. The mobile terminal 20 installs only a plug-in selected from a plug-in list. Accordingly, this may prevent an undesired plug-in from being installed.

For example, the mobile terminal 20 displays a plug-in list illustrated in FIG. 12. The mobile terminal 20 selects and installs only a plug-in checked in a check box according to a user input.

Otherwise, if it is determined that the printing application 50 exists in the mobile terminal 20 in operation 710, the mobile terminal 20 executes a printing application and establishes a wireless connection by using tag information in operation 735. The mobile terminal 20 executes the printing application 50 corresponding to a URL included in tag information. The mobile terminal 20 establishes a wireless connection with the image forming device 10 by using the identification information and the authentication code of the image forming device 10 that are included in the tag information.

The mobile terminal 20 obtains the user authentication information from the image forming device 10 in operation 740 and determines whether a current configuration of the printing application 50 corresponds to usage authority information in operation 745.

If it is determined that the current configuration of the printing application 50 corresponds to the usage authority information, the mobile terminal 20 reconfigures the printing application 50 in operation 750. For example, it is assumed that although a scan plug-in and a fax plug-in are installed on the printing application 50, usage authority information represents an authority to use a printing function and a scan function. The mobile terminal 20 deactivates a fax plug-in in order to remove a fax function not allowed for a user. For example, the mobile terminal 20 may uninstall the fax plug-in from the printing application 50. Moreover, the mobile terminal 20 installs a print plug-in. In such a manner, the mobile terminal 20 may update the configuration of the printing application 50 by using the usage authority information.

Figure 8:
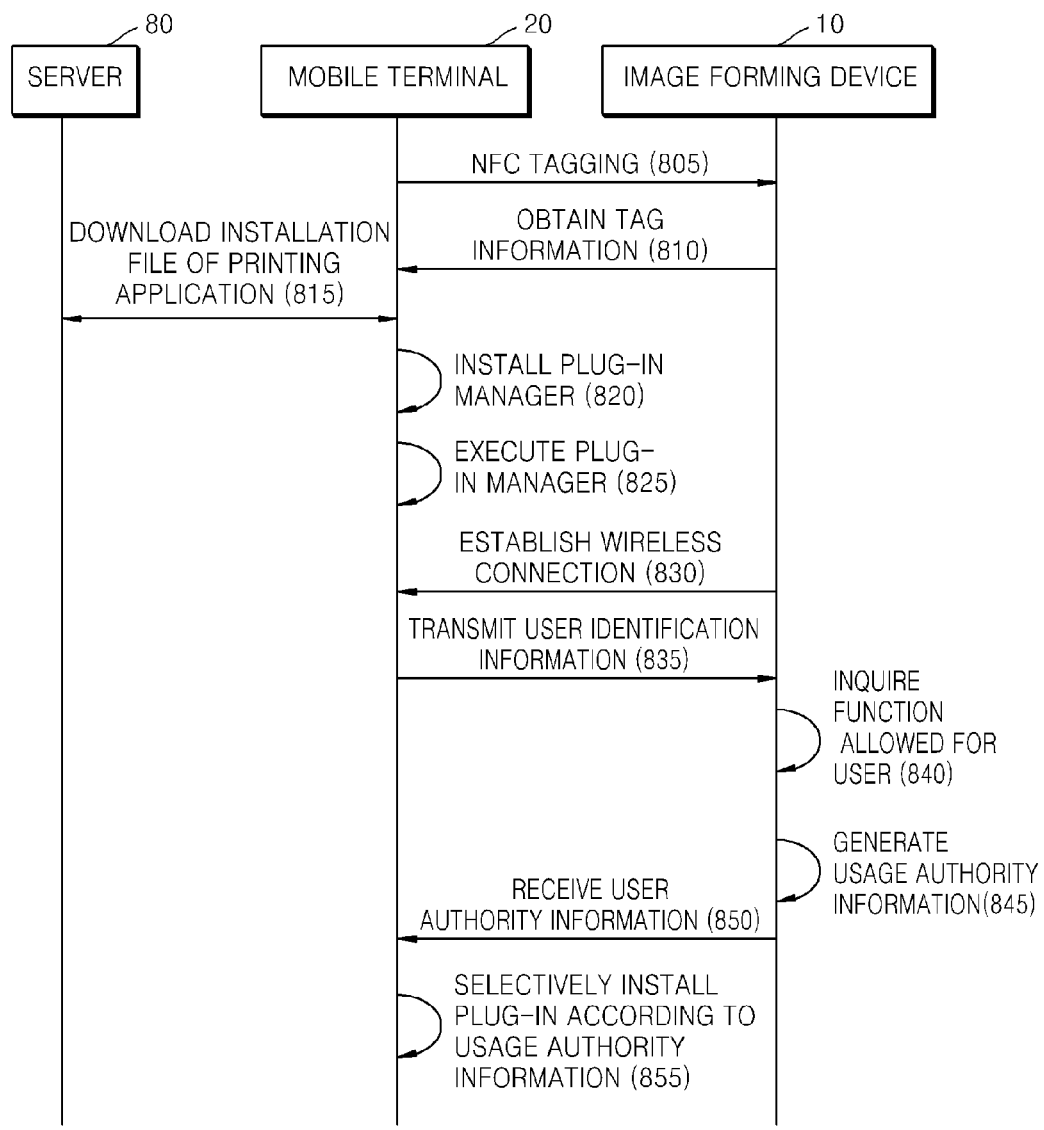
FIG. 8 is a flowchart of a method of customizing a configuration of a printing application, according to an embodiment.

FIG. 8 is a flowchart of a method of customizing a configuration of a printing application, according to an embodiment.

A server 80 provides the installation file of the printing application 50. The network address of the printing application 50 stored in the server 80 is a URL included in the tag information.

The mobile terminal 20 performs an NFC tagging operation on the NFC tag 30 of the image forming device 10. The mobile terminal 20 performs an NFC tagging operation on the NFC tag 30 of the image forming device 10.

The mobile terminal 20 obtains tag information from the image forming device 10 in operation 810. The mobile terminal 20 operates in an NFC reader mode and obtains tag information written on the NFC tag 30. According to an embodiment, when the image forming device 10 includes an NFC chip instead of the NFC tag 30, the mobile terminal 20 operates in a P2P mode and receives the NDEF message 40, for example, of FIG. 4.

The mobile terminal 20 downloads the installation file of a printing application by using a URL included in the tag information in operation 815.

The mobile terminal 20 installs the plug-in manager 510 by executing the installation file of the plug-in manager 510 included in the installation of the printing application in operation 820.

The mobile terminal 20 executes the plug-in manager 510 in operation 825 and provides the identification information and the authentication code of the image forming device 10 that are included in the tag information to the plug-in manager 510. The mobile terminal 20 establishes a wireless connection with the image forming device 10 through the plug-in manager 500 in operation 830.

The mobile terminal 20 transmits user identification information stored in the mobile terminal 20 to the image forming device 10 in operation 835. For example, the plug-in manager 510 collects user identification information stored in the mobile terminal 20 and transmits the collected user identification information to the image forming device 10 through an established wireless connection.

The image forming device 10 inquires a function allowed for a user of the mobile terminal 20 on the basis of the user identification information in operation 840. For example, the image forming device 10 determines whether there is a user account corresponding to the user identification information in a user database. If it is determined that there is no user account corresponding to the user identification information, the image forming device 10 generates user authority information representing that there is no authority to use the image forming device 10 and transmits the generated user authority information to the mobile terminal 20. According to an embodiment, the image forming device 10 generates usage authority information representing a function allowed for a guest having no user account and transmits the generated usage authority information to the mobile terminal 20.

If there is a user account corresponding to the user identification information, the mobile terminal 20 determines usage authorization that is mapped to a user account. For example, user account information such as that illustrated in FIG. 11 may be stored in a user database. If the image forming device 10 receives at least one user identification information of name: Jane, ID: J1, PW: ****, TEL 1: 1234, TEL 2: 5678, and E-mail: Jane@email.com from the mobile terminal 20, it may confirm that there is an A05 account and determines usage authorization that is mapped to the A05 account.

The user database may be included in the image forming device 10 but may be implemented as an external server independent of the image forming device 10. The image forming device 10 may transmit user identification information to an external server and may receive information on a function allowed for a user of the mobile terminal 20 from the external server.

The image forming device 10 generates usage authority information on the basis of the function allowed for a user in operation 845. For example, the image forming device 10 classifies the function allowed for a user via a plug-in unit. If the function allowed for a user is Scan to USB and Scan to PC, it is classified as a scan plug-in. The image forming device 10 generates usage authority information representing the plug-ins 520 and the function allowed for a user as a tree structure according to a classification result. For example, the Scan to USB and Scan to PC functions may be listed dependent on the scan plug-in in the usage authority information. The usage authority information illustrated in FIG. 10 may be generated based on the A10 account of FIG. 11. The terms [start] and [end] are inserted into the usage authority information to indicate the start and end of a script.

The mobile terminal 20 receives the usage authority information from the image forming device 10 in operation 850. The mobile terminal 20 selectively installs a plug-in according to the usage authority information in operation 855.

Figure 9:
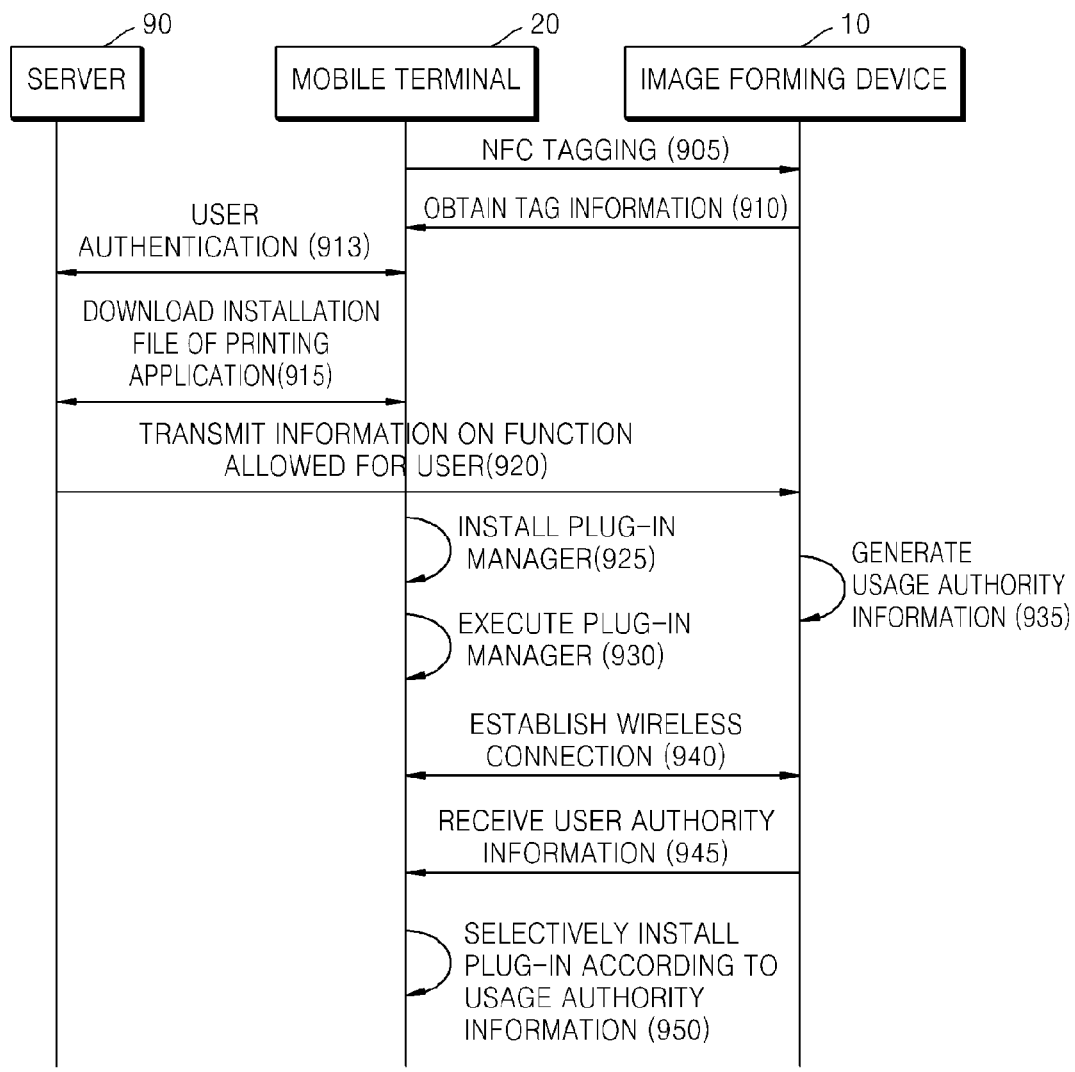
FIG. 9 is a flowchart of a method of customizing a configuration of a printing application, according to an embodiment.

FIG. 9 is a flowchart of a method of customizing a configuration of a printing application, according to an embodiment.

A server 90 provides the installation file of the printing application 50 and includes a user database. That is, information on a function allowed for a user is stored in the server 90.

The mobile terminal 20 tags the NFC tag of the image forming device 10 and obtains tag information in operation 910.

The mobile terminal 20 performs user authentication with the server 90 in operation 913. The mobile terminal 20 transmits user identification information to the server 90. The server 90 performs user authentication with the mobile terminal 20 by using the user identification information. For example, the server 90 determines whether there is a user account corresponding to the user identification information.

If the user authentication is successful, the server 90 provides the installation file of the printing application 50 to the mobile terminal 20 in operation 915. Additionally, the server 90 transmits the information on a function allowed for a user of the mobile terminal 20 to the image forming device 10 in operation 920. The order of operation 915 and operation 920 may be interchangeable and operation 915 and operation 920 may be performed simultaneously.

The mobile terminal 20 installs the plug-in manager 510 in operation 925 and executes the installed plug-in manager 510 in operation 930 and then establishes a wireless connection with the image forming device 10 in operation 940. The image forming device 10 generates usage authority information by using the information on a function allowed for a user in operation 935 and transmits the generated usage authority information to the motile terminal 20 in operation 945. The mobile terminal 20 selectively installs a plug-in according to the usage authority information in operation 950.

Figure 13:
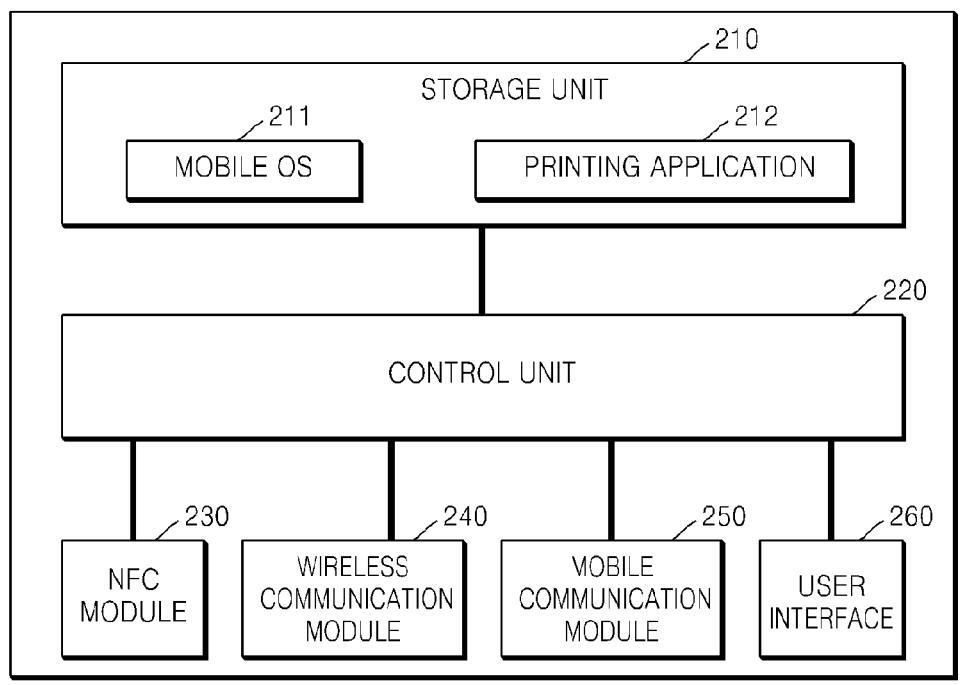
FIG. 13 illustrates a mobile terminal according to an embodiment.

FIG. 13 illustrates a mobile terminal according to an embodiment The mobile terminal 20 may be implemented in various forms. For example, the mobile terminal 20 disclosed may include, for example, a mobile phone, a smart-phone, a laptop computer, a digital broadcasting terminal, a personal digital assistant (PDA), a portable multimedia player (PMP), a navigation system, and a tablet PC.

Referring to FIG. 13, the mobile terminal 20 includes a storage unit 210, a control unit 220, an NFC module 230, a wireless communication module 240, a mobile communication module 250, and a user interface 260. It may be apparent to those skilled in the art that other typical components than the above components may be further included. For example, the other typical components may include a camera module, a DMB module, a GPS module, an image and voice processor, a power supply unit, a vibration motor, a speaker, a microphone, and a main board. Additionally, the illustrated components are not necessarily all essential components. The mobile terminal 20 may be implemented using more or less components than the illustrated components. For example, if the mobile terminal 20 is a wireless Internet-only tablet PC, the mobile communication module 250 may be omitted.

The NFC module 230 performs near field communication. The NFC module 230 may include an antenna and an NFC chipset. The NFC chipset includes circuit devices to operate in the Reader/Writer mode 301, the P2P mode 302, or the Card Emulation mode 303. When the NFC tag 30 is positioned (NFC tagging) within the coverage of an RF field in the Reader/Writer mode 301, the NFC module 230, reads tag information written on the NFC tag 30 (a read mode) and records or modifies predetermined information of the NFC tag 30 (a write mode). When the NFC module 230 is close to the image forming device 10 of FIG. 3A, including an NFC chipset, it operates in the P2P mode to perform bi-directional data transmission. If the NFC module 230 operates in the Card Emulation mode 303, it operates similar to the active or passive NFC tag 30.

According to an embodiment, a read mode operation in the Reader/Writer mode 301 of the NFC module 230 is disclosed. The NFC module 230 obtains tag information of the NFC tag 30 through NFC tagging. The tag information of the NFC tag 30 may be the NDEF message 40 illustrated in FIG. 4.

The wireless communication module 240 establishes a wireless connection with the image forming device 10 and transmits/receives data through the wireless connection. The wireless communication module 240 establishes a wireless connection with the image forming device 10 by using the tag information. The wireless connection module 240 detects the image forming device 10 by using the identification information of the image forming device 10 that is included in the tag information. The wireless communication module 240 performs WPS authentication with the image forming device 10 by using the authentication code included in the tag information.

The wireless communication module 240 transmits the user identification information stored in the mobile terminal 20 to the image forming device 10 according to a control of the control unit 220. The wireless communication module 240 receives the usage authority information representing a function allowed for a user of the mobile terminal 20 among functions of the image forming device 10.

The wireless communication module 240 accesses the URL included in the tag information and downloads the installation file of the printing application 212. For example, the wireless communication module 240 downloads the installation file of the plug-in manager 510 and the installation files of the plug-ins 520.

An exemplary process of establishing a wireless connection between the wireless communication module 240 and the image forming device 10 is disclosed. The wireless connection may be a WiFi or WiFi-direct connection but the embodiments are not limited thereto. If it is not indicated that WiFi-direct is excluded, WiFi includes WiFi-direct.

A WiFi-direct connection process of the wireless communication module 240 and the image forming device 10 is disclosed. The wireless communication module 240 searches for a candidate device that is available for WiFi-direct connection. The wireless communication module 240 collects information, such as MAC addresses of candidate devices (not shown), device type, and Service Set Identifier (SSID), through a probe request and a probe response, i.e., a wireless LAN packet.

The wireless communication module 240 attempts to establish a WiFi-direct connection with the image forming device 10 selected from among candidate devices in response to a request from the control unit 220. A group formation process and an authentication procedure for secure connection may be performed between the wireless communication module 240 and the image forming device 10. The group formation process may be defined as determining which device becomes a Group Owner (GO) or which device becomes a client. A connection between devices belonging to a formed group may need to be a secure connection, and a technology used at this time is WPS. WPS includes a PIN method and a Push Button Configuration (PBC) method. The PIN method authenticates a predetermined PIN code, and the PBC method performs authentication by pressing a hardware or software button equipped in a Group Owner (GO) device. Once the authentication process is successful, the image forming device 10, e.g., a GO, allocates an Internet Protocol (IP) address to the mobile terminal 20.

The wireless communication module 240 transmits a get device capability message to the image forming device 10 to request for device performance information through the IP address that the image forming device 10 allocates. The wireless communication module 240 receives information on whether a Print/Scan/Fax function is included, whether Color/Mono printing is available, a PCL language used, and Duplex/Simplex printing from the image forming device 10, but the present invention is not limited thereto. Through such a process, a WiFi-Direct connection may be established between the image forming device 10 and the mobile terminal 20.

In a case of a WiFi connection instead of a WiFi-direct connection, the wireless communication module 240 may belong to the same infra network as the image forming device 10 through the AP (802.11b/g/n). The image forming device 10 may allow an access of a device in the same infra network, a device having a specific IP, a device having a specific MAC, or a device having an account in the image forming device 10. When the wireless communication module 240 requests data transmissions from an AP through the IP address of the image forming device 10, the AP relays the data transmission to the image forming device 10 by referencing an ARP table.

According to an embodiment, a wireless connection process of the mobile terminal 20 and the image forming device 10 may be automated by utilizing the tag information of the NFC tag 30. When a connection between the mobile terminal 20 and the image forming device 10 has not been established yet, if the mobile terminal 20 is NFC tagged with the NFC tag 30 (read mode), the wireless communication module 240 searches for candidate devices in response to a request from the control unit 220. The wireless connection module 240 automatically selects the image forming device 10 from among the candidate devices by using the identification information of the image forming device 10 that is included in the tag information. If a device identifier is a MAC address, the wireless communication module 240 establishes a wireless connection with the image forming device 10 having a MAC address obtained from the NFC tag 30 among the found candidate devices. Since the wireless communication module 240 transmits an authentication code included in tag information to the image forming device 10 to perform an authentication operation automatically, a wireless connection may be established without inputting a PIN value to a mobile terminal or pressing the WPS button of the image forming device 10.

The wireless communication module 240 may transmit data of a job to be performed in the image forming device 10 or may receive a result of a job performed from the image forming device 10 through a wireless connection. The data of a job may be a print command of a PCL language and print data of a PDL language. The data of a job may be a scan command and a fax command. The result of a job performed may mean data of scanned document and fax transmission results but the present invention is not limited thereto.

The mobile communication module 250 transmits/receives data necessary for mobile communication by accessing a circuit switching network and a packet switching network and downloads predetermined application through the packet switching network.

The user interface 260 may be a touch screen through which a user manipulates the mobile terminal 20 or information processed in the mobile terminal 20 is displayed. The user interface 260 displays a list of plug-ins corresponding to usage authority information received from the image forming device 10 according to a control of the control unit 220. The user interface 260 receives a selection to install at least one plug-in in the list of plug-ins.

The user interface 260 may be configured diversely according to a product. For example, the user interface 260 may be configured in a two or four line form of a display such as an LCD or an LED, or may be configured with a GUI to allow various graphical expressions. The user interface 260 may include a touch sensor for detecting a user's gesture. The user interface 260 may be implemented using a capacitive or resistive touch sensor. As a sensor for detecting a touch, a haptic sensor or a proximity sensor may be included. The haptic sensor is a sensor for detecting a contact of a specific object at a degree that people sense or higher. The haptic sensor may detect various information, such as the roughness of a contact surface, the stiffness of a contact object or the temperature of a contact point. The proximity sensor is a sensor sensing an object approaching a predetermined detection surface or an object present in the vicinity by using the force of an electromagnetic field or infrared, without mechanical contact. The proximity sensor may include a transmissive photoelectric sensor, a direct reflective photoelectric sensor, a mirror reflective photoelectric sensor, a high-frequency oscillation proximity sensor, a capacitive proximity sensor, a magnetic proximity sensor, and an infrared proximity sensor.

The user input unit 260 may include a key pad, a dome switch, a jog wheel, a jog switch, and an H/W button.

The storage unit 210 may store a program for processing and control of the control unit 220, or may perform a function for storing input/output data. A mobile OS 211 may be stored in the storage unit 210, and the control unit 220 controls the mobile terminal 20 by executing the mobile OS 211. Additionally, the storage unit 210 may store a printing application 212 for using the print, scan, and fax functions of the image forming device 10. Descriptions of the printing application 212 are referred to with reference, for example, to FIG. 5.

The printing application 212 performs an image forming job such as print, scan, and fax in linkage with the image forming device 10. If the printing application 212 is not installed, it may be automatically installed through NFC tagging.

The storage unit 210 may include at least one type of storage medium among a flash memory type, a hard disk type, a multimedia card micro type, card type memory (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, and an optical disk. Additionally, the mobile terminal 20 may operate a web storage performing a storage function of the storage unit 210 on the Internet.

The control unit 220 controls overall operations of the mobile terminal 20 in general. For example, the control unit 220 performs the control and processing relating to content capture, a voice call, data communication, and a video call. The control unit 220 controls the NFC module 230, the wireless communication module 240, the mobile communication module 250, and the user interface 260, and the storage unit 210 by executing the mobile OS 211 and the printing application 212 stored in the storage unit 220.

The control unit 220 selectively installs a plug-in corresponding to usage authority information among the plug-ins 520 that the printing application 212 supports. The control unit 220 installs the printing application by using the URL included in tag information or executes the pre-installed printing application 212.

Figure 14:
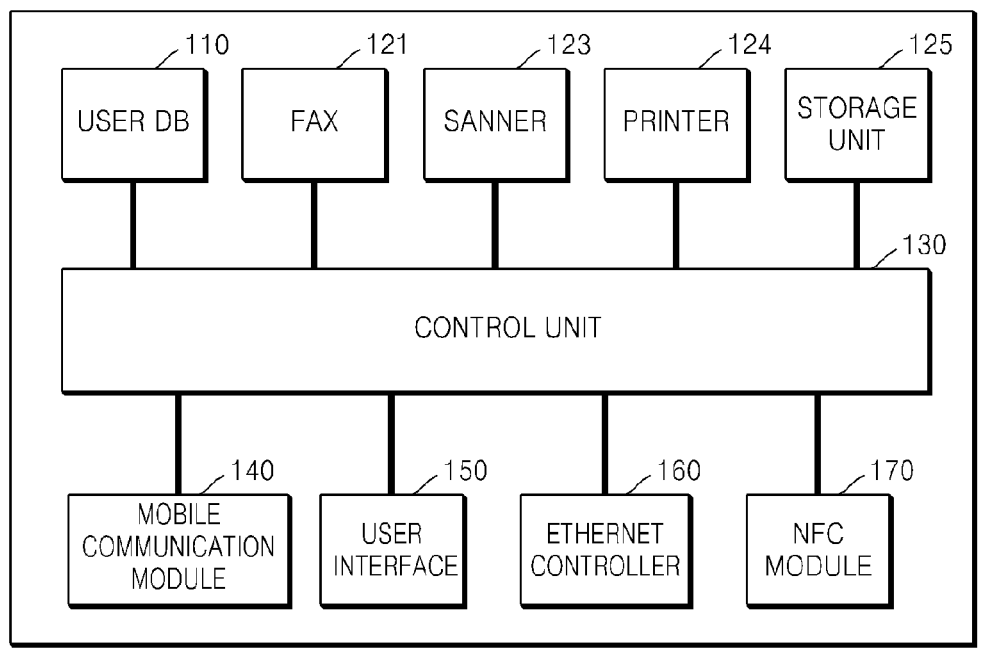
FIG. 14 illustrates an image forming device according to an embodiment.

FIG. 14 is a view of an image forming device 10 according to an embodiment. Description of content overlapped with the above-mentioned embodiments is omitted. Although the image forming device 10 is illustrated as an MFP, it may be a printer, a scanner, and a fax machine, or a copy machine, each performing a single function.

Referring to FIG. 14, the image forming device 10 includes a user DB 110, a fax machine 121, a scanner 123, a printer 124, a storage unit 125, a wireless communication module 140, a user interface 150, an Ethernet controller 160, and an NFC module 170. It is apparent to those skilled in the art that other typical components than the above components may be further included. Additionally, the illustrated components are not necessarily all essential components.

The printer 124, the fax machine 121, and the scanner 123 perform a printing function, a fax function, and a document scanning function, respectively. A copy function may be performed by driving both the printer 124 and the scanner 123.

The storage unit 125 may provide a document box function for storing a file for each user. The document box may be provided by each user. The document box may include a personal box generated for each user and a public box allowed for all users. A file stored in the document box may include a print job, print data of a PDL language, rendered print data, an image file, and a word document in addition to the above-mentioned fax document, scan document, and e-mail, but the present invention is not limited thereto. Additionally, the storage unit 125 stores the firmware of the image forming device 10.

The user DB 110 stores information on a user's account and authority. The user DB 110 and the storage unit 125 may be implemented as one storage.

The Ethernet controller 160 may be defined as hardware for performing wired Ethernet communication according to IEEE 802.3.

The wireless communication module 140 establishes a WiFi or WiFi-direct wireless connection with the mobile terminal 20 via an AP. The wireless communication module 140 receives user identification information of the mobile terminal 20 from the mobile terminal 20. The wireless communication module 140 transmits usage authority information in response to the received user identification information. The wireless communication module 140 may be understood from the description of the wireless communication module 240 of the mobile terminal 20.

The user interface 150 is hardware serving as a medium through which a user confirms information of the image forming device 10 and inputs a command to the image forming device 10. The user interface 150 may be understood from the description of the user interface 260 of the mobile terminal 20.

According to an embodiment, the user interface 260 may be implemented with a detachable device. For example, when the user interface 260 is separate from the image forming device 10, it may operate similar to a tablet PC.

The NFC module 170 may include an NFC chipset like the NFC module 230 of the mobile terminal 20. In this case, the image forming device 10 and the mobile terminal 20 may operate in the P2P mode. According to an embodiment, the NFC module 170 includes a slot for mounting the NFC tag 30, supplies power to operate the NFC tag 30 as an active tag, and allows the image forming device 10 to read and write information from and on the NFC tag 30 by itself. The NFC module 170 may be omitted according to an embodiment.

The control unit 130 performs a function controlling overall operations of the image forming device 10, and information necessary for control is stored in the storage unit 125 and read, if necessary. The control unit 130 determines a function allowed for a user of the mobile terminal 20 on the basis of user identification information. For example, the control unit 130 determines whether there is a user account corresponding to the user identification information through the user DB 110.

The control unit 130 generates usage authority information on the basis of a function allowed for a user of the mobile terminal 20. For example, the control unit 130 classifies a function allowed for a user via a plug-in unit, and according to a classification result, represents plug-ins and a function allowed for a user as a tree structure.

As described above, according to the one or more embodiments, by automatically customizing a configuration of a printing application according to a user's authority, the user's confusion and resource waste caused when a function unavailable to a user is installed together may be reduced. Additionally, the security on using an image forming device may be improved by hiding a function unavailable to a user through a printing application. Moreover, a user interface of an image forming device, which is differently configured according to a logged-in user, may be reflected in a printing application of a mobile terminal.

Moreover, an exemplary embodiment may be written as a program executable in a computer and implemented in a general-purpose digital computer executing the program through a non-transitory computer-readable recording medium. Additionally, the data structures used in an exemplary embodiment may be recorded on a non-transitory computer-readable recording medium through various methods. The non-transitory computer-readable recoding medium includes a storage medium such as a magnetic storage medium (for example, ROM, floppy disk, and hard disk) and an optical recording medium (for example, CD-ROM or DVD).

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of customizing a configuration of a printing application of a mobile terminal, the method comprising:
    establishing a wireless connection with an image forming device by using tag information written on a near field communication (NFC) tag of the image forming device;
    receiving usage authority information at the mobile terminal that is generated by the image forming device representing a function allowed for a user of the mobile terminal among functions of the image forming device;
    determining which at least one plug-in corresponds to the function allowed for the user based on the received usage authority information, among a plurality of plug-ins supported by the printing application;
    downloading an installation file including the plurality of plug-ins and a plug-in manager;
    selecting the plug-in manager from the downloaded installation file and installing the selected a-plug-in manager providing a platform to execute the determined at least one plug-in; and
    selectively installing the determined at least one plug-in to be executed on the provided platform.

2. The method of claim 1, further comprising installing the printing application by using a uniform resource locator (URL) included in the tag information or executing the printing application installed in advance.

3. The method of claim 2, wherein downloaded installation file is an installation file of the printing application.

4. The method of claim 1, wherein the establishing of the wireless connection comprises:
    detecting the image forming device through identification information of the image forming device that is included in the tag information, and
    performing a Wi-Fi Protected Setup (WPS) authentication operation with the image forming device by using an authentication code included in the tag information.

5. The method of claim 1, further comprising transmitting user identification information stored in the mobile terminal to the image forming device through the printing application.

6. The method of claim 5, further comprising generating the usage authority information by using the user identification information that the image forming device receives from the mobile terminal.

7. The method of claim 1, wherein the tag information comprises at least one of URL information for installation of the printing application, identification information of the image forming device, and an authentication code for WPS authentication with the image forming device.

8. The method of claim 1, wherein the installing of the at least one plug-in comprises:
    displaying a list of plug-ins corresponding to the usage authority information,
    selecting at least one plug-in from the list on the basis of a user input, and
    installing the selected plug-in.

9. The method of claim 1, wherein the installing of the at least one plug-in comprises:
    downloading an installation file of a plug-in corresponding to the usage authority information through a plug-in manager included in the printing application, and
    installing the at least one plug-in by using the downloaded installation file of the plug-in.

10. A supporting method of an image forming device to customize a printing application of a mobile terminal, the method comprising:
    receiving at the image forming device user identification information of the mobile terminal from the mobile terminal; and
    transmitting usage authority information representing a function allowed for a user of the mobile terminal among functions of the image forming device in response to the received user identification information,
    wherein the mobile terminal receives the transmitted usage authority information, determines which at least one plug-in corresponds to the function allowed for the user based on the transmitted usage authority information, among a plurality of plug-ins supported by the printing application, downloads an installation file including the plurality of plug-ins and a plug-in manager, selects the plug-in manager from the downloaded installation file and installs the selected plug-in manager providing a platform to execute the determined at least one plug-in, and selectively installs the determined at least one plug-in to be executed on the provided platform.

11. The method of claim 10, further comprising:
    inquiring the function allowed for a user on the basis of the user identification information, and
    generating the usage authority information on the basis of the function allowed for a user.

12. The method of claim 11, wherein the inquiring of the function allowed for a user comprises determining whether there is a user account corresponding to the user identification information through a user database inside or outside the image forming device.

13. The method of claim 11, wherein the generating of the usage authority information comprises:
    classifying the function allowed for a user via a plug-in unit, and
    generating the usage authority information representing the plug-ins and the function allowed for a user as a tree structure according to the classification result.

14. A supporting method of an image forming device to customize a printing application of a mobile terminal, the method comprising:
    receiving at the image forming device user identification information of the mobile terminal from the mobile terminal;
    transmitting usage authority information representing a function allowed for a user of the mobile terminal among functions of the image forming device in response to the received user identification information; and providing to the mobile terminal an NFC Data Exchange Format (NDEF) message including uniform resource locator (URL) information for installation of the printing application, identification information of the image forming device, and an authentication code for Wi-Fi Protected Setup (WPS) authentication with the image forming device according to near field communication (NFC) tagging of the mobile terminal, wherein the mobile terminal receives the transmitted usage authority information, determines which at least one plug-in among a plurality of plug-ins that the printing application supports corresponds to the function allowed for the user in the transmitted usage authority information, and selectively installs the determined at least one plug-in.

15. A mobile terminal comprising:

a near field communication (NFC) module configured to obtain tag information written on an NFC tag of an image forming device;

a wireless communication module configured to establish a wireless connection between the mobile terminal and the image forming device by using the tag information and to receive usage authority information that is generated by the image forming device representing a function allowed for a user of the mobile terminal among functions of the image forming device; and a control unit configured to install at the mobile terminal a printing application by using a uniform resource locator (URL) included in the tag information and determining which at least one plug-in corresponds to the function allowed for the user in the received usage authority information, among a plurality of plug-ins, to download an installation file including the plurality of plug-ins and a plug-in manager, to select the plug-in manager from the downloaded installation file and install the selected plug-in manager providing a platform to execute the determined at least one plug-in, and selectively installing the determined at least one plug-in to be executed on the provided platform.

16. The mobile terminal of claim 15, wherein the wireless communication module transmits user identification information stored in the mobile terminal to the image forming device according to a control of the control unit.

17. The mobile terminal of claim 15, further comprising a user interface displaying a list of plug-ins corresponding to the usage authority information, wherein the control unit selects at least one plug-in from the list in response to a user input received through the user interface and installs the selected plug-in.

18. A system including an image forming device and a mobile terminal, wherein the image forming device configured to receive user identification information of the mobile terminal from the mobile terminal and to transmit usage authority information to the mobile terminal representing a function allowed for a user of the mobile terminal among functions of the image forming device in response to the received user identification information from the mobile terminal; and the mobile terminal configured to automatically determine at least one plug-in corresponding to the function allowed for the user in the transmitted usage authority information from the image forming device, among a plurality of plug-ins that the printing application supports, to download an installation file including the plurality of plug-ins and a plug-in manager, to select the plug-in manager from the downloaded installation file and install the selected plug-in manager providing a platform to execute the determined at least one plug-in, and to selectively install the determined at least one plug-in to be executed on the provided platform.

19. The system of claim 18, wherein the image forming device determines whether there is a user account corresponding to the user identification information through a user database inside or outside the image forming device and inquires a function allowed for the user account.

20. The system of claim 18, wherein the image forming device classifies the function allowed for a user via a plug-in unit and generates the usage authority information representing the plug-ins and the function allowed for a user as a tree structure according to the classification result.

21. The method of claim 1, further comprising deactivating, by the mobile terminal, a plug-in not authorized for a user.

22. The method of claim 21, further comprising deactivating the plug-in not authorized for the user by deinstalling the plug-in.

* * * * *